(12) United States Patent
Ravi et al.

(10) Patent No.: US 11,526,760 B2
(45) Date of Patent: Dec. 13, 2022

(54) TRAINING SYSTEM FOR ARTIFICIAL NEURAL NETWORKS HAVING A GLOBAL WEIGHT CONSTRAINER

(71) Applicant: Wisconsin Alumni Research Foundation, Madison, WI (US)

(72) Inventors: Sathya Narayanan Ravi, Madison, WI (US); Tuan Quang Dinh, Madison, WI (US); Vishnu Sai Rao Suresh Lokhande, Madison, WI (US); Vikas Singh, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 1070 days.

(21) Appl. No.: 16/186,121

(22) Filed: Nov. 9, 2018

(65) Prior Publication Data

US 2020/0151570 A1    May 14, 2020

(51) Int. Cl.
*G06N 3/00* (2006.01)
*G06N 3/08* (2006.01)
(Continued)

(52) U.S. Cl.
CPC ............. *G06N 3/084* (2013.01); *G06F 17/16* (2013.01); *G06N 3/0481* (2013.01)

(58) Field of Classification Search
CPC ....... G10L 15/32; G10L 15/28; G10L 15/063; G10L 2015/0631; G10L 2015/0636; G10L 15/065; G10L 15/075; G10L 15/08; G10L 15/083; G10L 15/16; G10L 15/20; G10L 2015/225; G10L 2015/228; G10L 15/285; G10L 15/34; G10L 17/02; G10L 17/04; G10L 17/06; G10L 17/08; G10L 17/10; G10L 17/12; G10L 17/18; G10L 17/20; G10L 25/27; G10L 25/00; G10L 25/30; G06N 3/0454; G06N 3/0481; G06N 3/08; G06N 3/084; G06N 3/02; G06N 3/04; G06N 3/0445; G06N 3/0463; G06N 3/049; G06N 3/06; G06N 3/082; G06N 3/10;
(Continued)

(56) References Cited

U.S. PATENT DOCUMENTS

| 10,754,744 B2 * | 8/2020 | Sankaralingam ....... G06F 8/443 |
| 2019/0244098 A1 * | 8/2019 | Tsukamoto .......... G06N 3/0445 |

(Continued)

OTHER PUBLICATIONS

F. Morchen, "Analysis of speedup as function of block size and cluster size for parallel feed-forward neural networks on a Beowulf cluster," in IEEE Transactions on Neural Networks, vol. 15, No. 2, pp. 515-527, Mar. 2004. (Year: 2004).*

(Continued)

*Primary Examiner* — Edgar X Guerra-Erazo
(74) *Attorney, Agent, or Firm* — Boyle Fredrickson, S.C.

(57) ABSTRACT

An architecture for training the weights of artificial neural networks provides a global constrainer modifying the neuron weights in each iteration not only by the back-propagated error but also by a global constraint constraining these weights based on the value of all weights at that iteration. The ability to accommodate a global constraint is made practical by using a constrained gradient descent which approximates the error gradient deduced in the training as a plane, offsetting the increased complexity of the global constraint.

10 Claims, 2 Drawing Sheets

(51) Int. Cl.
*G06N 3/04* (2006.01)
*G06F 17/16* (2006.01)

(58) Field of Classification Search
CPC ........ G06N 3/105; G06N 5/003; G06N 5/025; G06N 5/042; G06N 5/045; G06N 5/046; G06N 5/047; G06N 5/041; G06N 5/043; G06N 7/005; G06N 7/046; G06N 7/04; G06N 7/06; G06N 20/00; G06N 20/10; G06N 20/20; G06F 40/44
See application file for complete search history.

(56) References Cited

U.S. PATENT DOCUMENTS

2019/0251441 A1* 8/2019 Lu .................. G06N 3/0454
2020/0005152 A1* 1/2020 Blundell ............ G06N 3/084

OTHER PUBLICATIONS

S. Venkataramani, A. Ranjan, K. Roy and A. Raghunathan, "AxNN: Energy-efficient neuromorphic systems using approximate computing," 2014 IEEE/ACM International Symposium on Low Power Electronics and Design (ISLPED), 2014, pp. 27-32. (Year: 2014).*

* cited by examiner

TRAINING SYSTEM FOR ARTIFICIAL NEURAL NETWORKS HAVING A GLOBAL WEIGHT CONSTRAINER

STATEMENT REGARDING FEDERALLY SPONSORED RESEARCH OR DEVELOPMENT

This invention was made with government support under AG040396 awarded by the National Institutes of Health and 1252725 awarded by the National Science Foundation. The government has certain rights in the invention.

CROSS REFERENCE TO RELATED APPLICATION

Background of the Invention

The present invention relates generally to computer architectures and, in particular, to an architecture providing improved training of artificial neural networks.

Artificial neural networks (henceforth neural network) are computing systems inspired by the brain. A common design of a neural net provides multiple layers of "neurons" where each layer has multiple connections to preceding and/or succeeding layers. Each of the multiple inputs to each neuron is associated with a weight, and the neuron provides an output that is a nonlinear function of the weighted sum of the data from the input connections.

The final layer of the neural net typically provides a classification, for example, expressed as an output vector having elements associated with different classification possibilities. In a common example of a neural net that is trained to review image data and classify that image data, the output vector may classify the image according to whether it shows a particular subject, for example, an automobile or a pedestrian.

The weights of the neural network are obtained by a training process in which example data with known classification is provided in a "training set" to the neural network and the weights adjusted iteratively so that the output classification converges to the known classification of the training set data.

During training, examples from the training set are applied to the neural network, and output from the neural network is compared to a desired output to produce an error value representing a difference between the desired output an actual output obtained with the current weights. This error value is "backpropagated" through the neurons and used iteratively to adjust the weights of each neuron. Over multiple training examples, the weights ideally converge to a set of weights that produces the desired output for each of the training set examples.

The large amount of data and large number of iterations required for training can incur substantial computational costs even with high-speed architectures using specialized hardware such as graphic processing units. Moreover, most real world uses of artificial neural networks anticipate constant retraining as the operating neural networks experience new situations. For example, an artificial neural network used in an autonomous vehicle will desirably be retrained regularly as it and other vehicles collect additional data during use.

Training an artificial neural network presents a gradient descent problem. The generated error is part of an error function whose surface height indicates an error corresponding to the current weights. Training the weight values involves iteratively adjusting the weights to try to move downhill on this error function surface. Determining the "downhill" direction at any given iteration can require substantial calculation in determining the local gradient for each weight.

This process of gradient descent can be made substantially faster by not determining a gradient for each example data in the training set for the entirety of the dataset at once but rather choosing a random subset of data and making the determination based on only that subset. This subset is then varied between iterations. This process is known as statistical (or stochastic) gradient descent and is widely used in the training of artificial neural networks in order to provide sufficient speed.

Some researchers have noticed that training time and calculation burden can be reduced by constraining the values of the weights globally, for example, trying to keep the weight values close to one. Applying these constraints to the statistical gradient descent calculation, however, can be difficult or impossible and can lead to convergence problems.

SUMMARY OF THE INVENTION

The present invention provides an artificial neural net training processor that applies global constraints to the weights of the artificial neural network thus producing substantial reductions in training time. In some cases, a near $\frac{1}{3}$ reduction in training time can be obtained. Alternatively, for the same precision, the required neurons in the neural net may be reduced as much as 50 percent.

The ability to practically apply global constraints during the training process is made practical through the use of a "conditional gradient descent" rather than "statistical gradient descent." Unlike the statistical gradient descent, the conditional gradient descent considers the local gradients of all weights but makes up in this completeness by approximating those weights as a sloped plane. While the error function as such can be much complicated, optimizing this sloped plane with global constraints can be very simple. This provides a simplification to the calculation without the complexity and convergence problems associated with statistical gradient descent.

Specifically, then, the present invention provides a neural network architecture for training weights of an artificial neural network, the architecture having a set of neurons arranged in multiple layers between network inputs and network outputs, each neuron providing a set of weights applied individually to separate neuron inputs to produce a neuron output. The architecture includes a memory adapted to hold a training set comprising multiple sets of examples, each said example linked to a particular desired output. An error calculator determines an error between an output at the network output for a given example of a given set compared to the desired output linked to a given set, and a constrained weight adjuster globally adjusts the weights of the neurons over multiple iterations according to a backpropagated portion of the error at each neuron at each iteration, the constrained weight adjuster operating to constrain adjustment of given weights according to a predetermined constraint dependent on the value of substantially all weights at a given iteration.

It is thus a feature of at least in one embodiment of the invention to provide a global constraint on the weights allowing improved trade-off between training convergence time, precision, and network complexity.

The constrained weight adjuster may include a library of constraint definitions and provide a selector input for selecting among those constraint definitions to provide a different predetermined constraint.

It is thus a feature of at least one embodiment of the invention to allow selection of a global constraint based on a priori knowledge of the training set or empirical study of the best global constraint for a particular training set.

The constraint definitions may include constraints constraining a vector sum of the weights and constraints constraining a variance of the weights.

It is thus a feature of at least one embodiment of the invention to provide for the ability to handle both constraints on the value of the weight vector and constraints relating to statistical measures of the weight vector.

The constrained weight adjuster may adjust the weights of the neurons in a conditional gradient descent in which a gradient of the error at the current weights is approximated by a multidimensional plane.

It is thus a feature of at least one embodiment of the invention to offset the additional computational burden of a constraint that considers all weights by providing a simplified gradient descent that uses an approximation of those weights. Thus it is a feature of at least one object of the invention to consider all of the weights globally by simplifying the contribution of each weight.

The adjustment is limited to a vector describing the weight values to within a predefined multidimensional volume having dimensions equal to the number of substantially all the weights.

It is thus a feature of at least one embodiment of the invention to reduce the range of the weights to better match hardware requirements, for example, of limited precision computer dividers.

The multidimensional volume constraining the weight values may be a sphere.

It is thus a feature of at least one embodiment of the invention to provide a computationally intuitive constraint system that does not favor particular constraint values.

Alternatively, the multidimensional volume may be an n-dimensional parallelepiped. This parallelepiped may have sides aligned with axes of a multidimensional space holding the multidimensional volume or may have vertices lying on axes passing through the origin of the dimensions.

It is thus a feature of at least one embodiment of the invention to provide a computationally simple constraint that can look simply at vector component ranges (the former case) or a constrained system that promotes sparsity (the latter case).

In one embodiment the adjustment may be limited to limit a global variance across the substantially all weights.

It is thus a feature of at least one embodiment of the invention to provide a constraint that considers statistical qualities of the weight vector.

These particular objects and advantages may apply to only some embodiments falling within the claims and thus do not define the scope of the invention.

DETAILED DESCRIPTION OF THE PREFERRED EMBODIMENT

Figure 1:
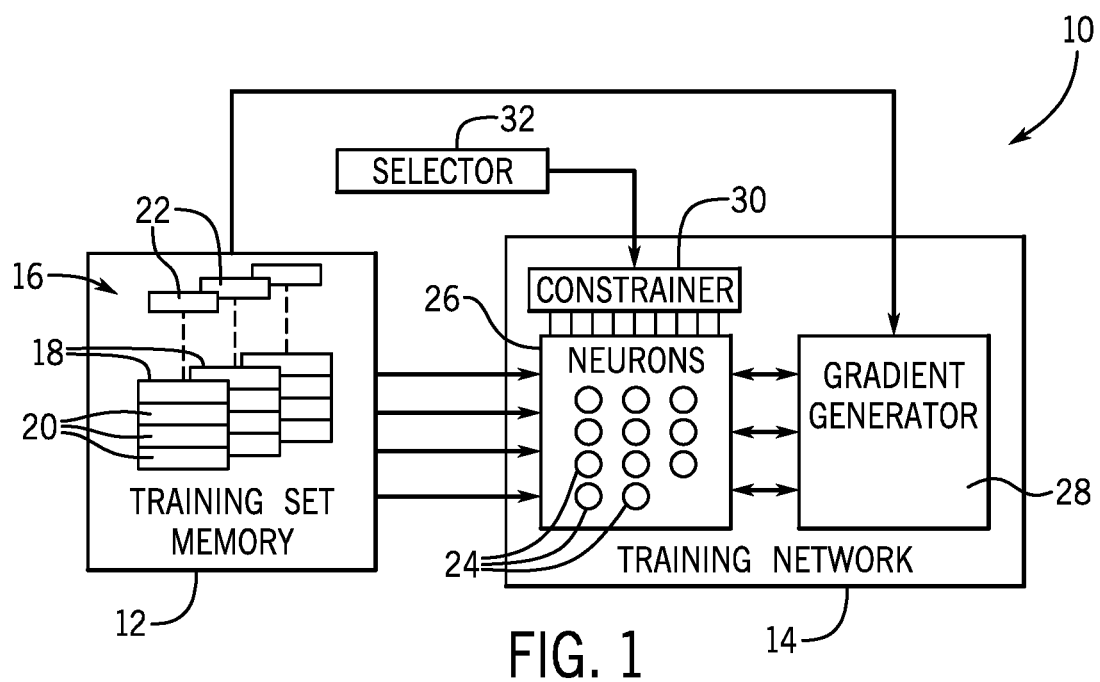
FIG. 1 is a block diagram of a neural net processor of the present invention having a set of neurons arranged in a network and communicating with a training set stored in memory, the training set holding examples and desired outputs, the architecture further including a gradient generator determining training errors and a global constrainer having selectable constraint functions.

Referring now to FIG. 1, a high-speed training system 10 for artificial neural networks may provide for a memory 12 communicating with a neural net processor 14. The memory 12 may hold a training set 16 providing training subsets 18 each having a set of different examples 20 associated with a given target output 22. For example, in training an image classifier, each training subset 18 may be associated with different animals, and each training example 20 may be a different image of that type of animal. The target output 22 associated with the training subset 18 may be a particular classification of the animal (e.g., horse). The memory 12 may be a standard high-speed computer memory, for example, including random access memory and disk storage or the like.

The neural net processor 14 provides a special-purpose processor, for example, constructed of an array of graphic processing units or using custom integrated circuits intended for the purpose of implementing neurons of an artificial neural network such as Google's tensor processing unit (TPU). In this respect, the neural net processor 14 will include specific computational circuits and firmware or software to implement a set of interconnected neurons 24 forming a neural network 26. Each neuron 24 will include a set of weights (not shown in FIG. 1) which define normal operation of the neural network 26 and whose values are determined during the training process.

When training is undertaken, the neural network 26 may receive data successively from each example 20 of the training set 16 for processing by the neurons 24. The output of the neural network 26 may then be received by a gradient generator 28. The gradient generator 21 also receives from the training set 16 the target output 22 associated with that example 20 and with this target output 22 and the output of the neural network 26, and the gradient generator 28 determines an error value being the difference between this target output 22 and the actual output from the neural network 26 for the particular training example 20.

This error value is then backpropagated through the network to provide a neuron error or neuron-related gradient 54 for each of the neurons 24. As will be discussed below, these neuron-associated gradients 54 will be used to modify the weights of that neuron 24 for that given iteration.

After this modification is complete, a new training example 20 is provided to the neural net processor 14 and this process repeated, further modifying the weights until an average error value over the entire training set drops below a predetermined threshold indicating a convergence of the weights to a desired solution and thus completion of the training.

Importantly, neural net processor 14 also includes a global constrainer 30 which communicates with each neuron 24 to receive weight values and the neuron-related gradients 54 and limits the amount of change in the weights during each stage of the iteration that would otherwise be suggested by the gradient and weight values. The constraint enforced by the global constrainer 30 is global meaning that it is a function of all of the weights of all the neurons rather than determined simply by the individual weight of a single neuron and its back-propagated, neuron-related gradient value.

Figure 2:
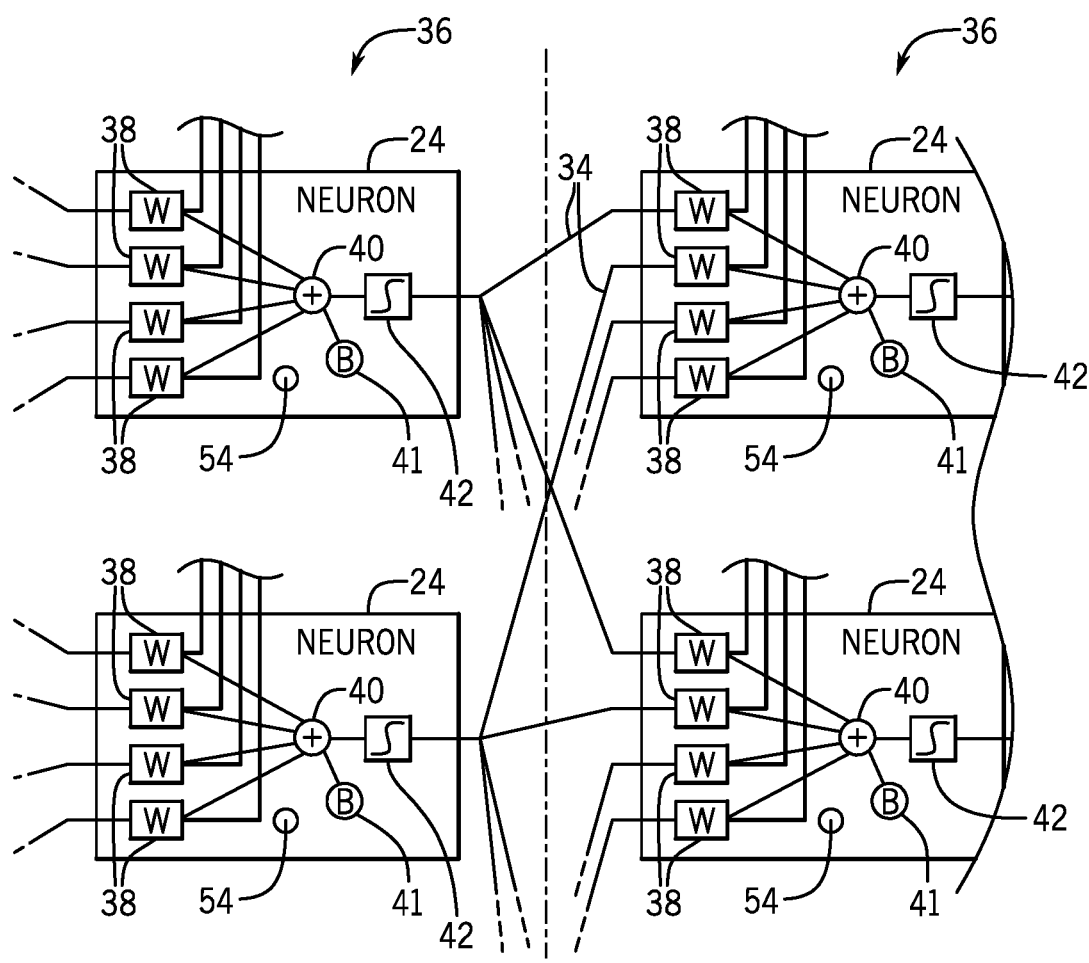
FIG. 2 is an expanded fragmentary view of the neurons of FIG. 1 showing their interconnection and communication of their weights to the global constrainer.

Referring now to FIGS. 1 and 2, generally each neuron 24 will provide a set of interconnections 34 between it and adjacent neurons 24 so as to form the neural network 26 as a set of different layers 36. For most layers 36, the outputs of each 24 of the preceding layer 36 will connect to an input of every neuron 24 in the succeeding layer 36. For the initial layer 36, the neurons 24 receive data directly from the memory 12 (training set examples), and for the final layer 36 the neurons 24 provide data directly to the gradient generator 28. The layers 36 may be actual layers or virtual layers, the latter arising in a recurrent neural network in which data is recycled in successive instantiations of a single hardware layer.

While the present invention can work with a variety of neuron types, as discussed above, all neurons 24 will be associated with a set of weights 38 designated as ($W_j$). Collectively, the weights 38 in the neural network 26 form a weight vector designated (W). A weight 38 is associated with each input of each neuron 24 and during operation of the neural network 26, the weight 38 for each neuron input is multiplied by the value received on that input. The output of each weight 38 of a neuron 24 is then summed by summing junction 40 and optionally added with a bias 41 (also trained like the weights 38 during training) and then compressed by activation function 42 which provides a single neuron output that may connect with the neurons 24 of succeeding layers 36. The activation function 42 will typically implement a sigmoid or hyperbolic tangent function compressing the value of the output between two values (for example, −1 and +1).

During backpropagation, an error generated by the gradient generator 28 moves backward through the neurons 24 passing through the weights 38 to produce a gradient 54 associated with each neuron 24.

Normally this neuron-related gradient 54 would be used to produce a small change in the weight 38 by multiplying the gradient 54 times the weight 38 and adding a fraction of that value to the current weight 38 to produce a new weight 38. This process is local, meaning that it can be done without data outside of the neuron 24 or looking at more than one weight 38. In the present invention, however, the change in the weight value of each weight 38 is constrained by the constrainer 30 as a function of all of the other weights 38 within that neuron 24 and other neurons 24 in the same and different layers 36.

In globally constraining the change in the weights 38, the constrainer 30 may implement a number of different types of constraints selected by a selector circuit 32 which may, for example, be a user interface allowing the individual managing the training to select a constraint type. Alternatively the selector circuit 32 may produce a selection automatically by analysis of the type of data of the training set based on empirical evaluation of these constraint types.

Figure 3:
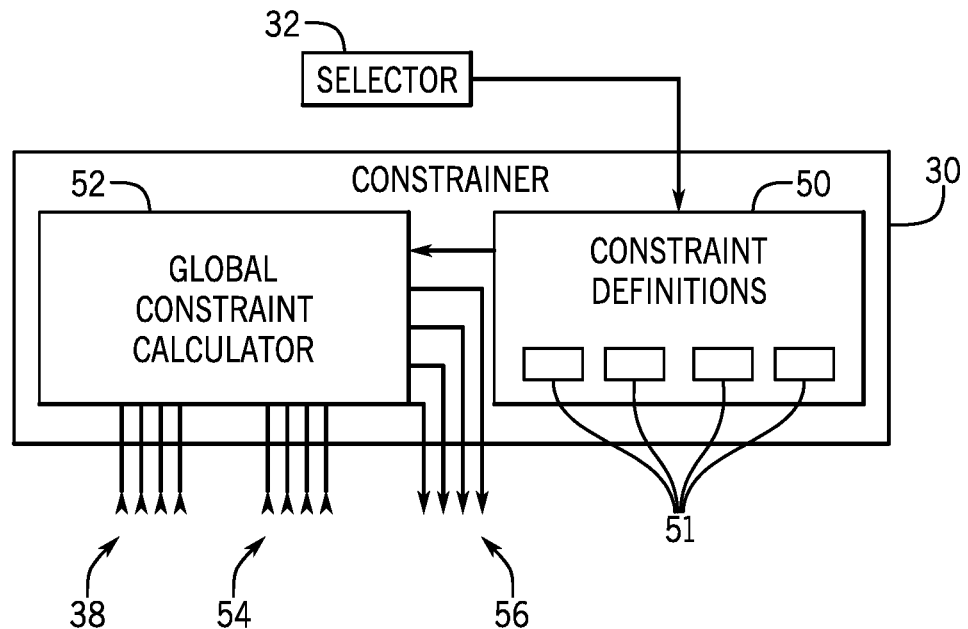
FIG. 3 is a block diagram of the global constrainer showing its receipt of a selection input for selecting among constraint definitions implemented by the constrainer.

Referring to FIG. 3, a selection of a particular constraint type for the constrainer 30 may be done by selector circuit 32 which points to a particular constraint definition 51 from a definition file 50 whose contents will be discussed below. This constraint definition 51 is used by a global constraint calculator 52 which also receives the weight values 38 from each neuron 24 as well as the backpropagated gradients 54 associated with each weight 38 to produce a new weight 38 that will then be used for the next iteration of a forward propagation of a training set example 20.

In order to practically constrain the weights 38 globally, the global constraint calculator 52 implements a conditional descent gradient process. Unlike the statistical gradient descent, the conditional gradient descent considers all of the dimensions of the error function in determining a gradient but simplifies the gradient to be a single multidimensional plane. This may be done, for example, by approximating the gradient as the first term of the Taylor series representation of the gradient (being the linear term). Generally, a conditional gradient solves a linear minimization problem instead of a quadratic one as follows:

$$s_t \in \arg \min_W g_t^T W \text{ s.t. } R(W) \le \lambda \qquad (1)$$

where $g_t^T$ is a transposition of the gradient vector (the error function) at a current point in the multidimensional space holding of the weight vector, at the current weight vector W point. As noted, this term $g_t^T$ essentially represents a linear approximation of the gradient (first term of the Taylor expansion around $W_t$). The term $s_t$ represents a point in a restricted domain of the domain of W and points to a direction of minimization. Using equation (1) the next iterative value of W is then determined as:

$$W_{t+1}^{CG} \leftarrow \eta W_t + (1-\eta) s_t \qquad (2)$$

where the subscript t is the iteration index and η is a predetermined step size for the gradient descent, typically between 0 and 1. The value $W_{t+1}$ is a vector sum of all of the weights 38. Effectively this approach simplifies the gradient descent to descend on a simple planar surface that adjusts for each iteration to approximate the gradient at the new weight point.

Figure 4:
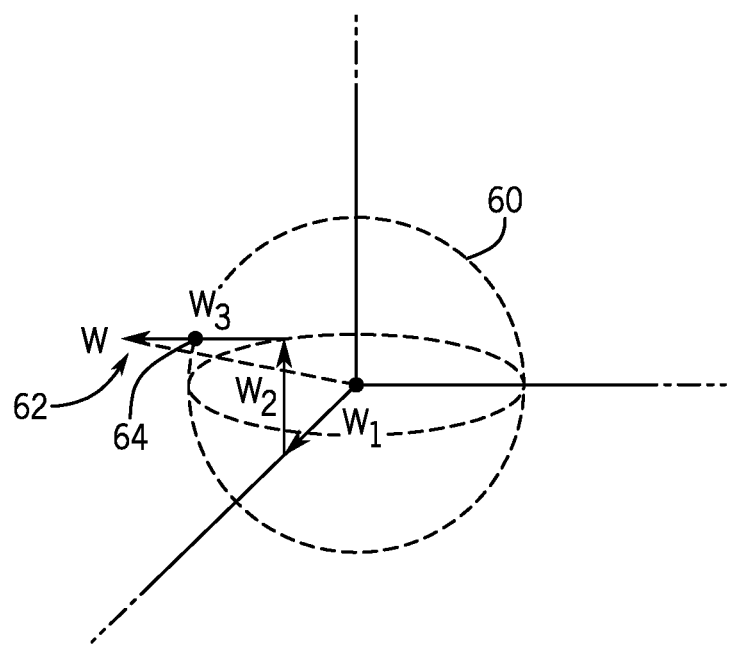
FIG. 4 is a highly simplified representation of a boundary-type constrainer constraining the weight vector according to one constraint definition.

Referring now momentarily to FIG. 4, this new vector of $W_{t+1}$ represented by new weight value 62 is not used as the next weight vector but is constrained by the constrainer 30. As discussed above this constraint is a global constraint that is a function of all of the constituent weights 38. Conceptually, the invention provides a constraint boundary 60 within which a new weight value 64 is found and used to replace $W_{t+1}$ as computed in the equation (2).

In some cases, the boundary 60 applies geometrically (in multi-dimensions) to the final weight value 62 and in some case the constraints may operate on a statistical quality of the final weight 62, for example, limiting the variance of the constituent weights ($W_1$, $W_2$, . . . ) less susceptible to the geometric representation.

As noted, the global constraint calculator 52 implements this conditional gradient descent with selected different constraint functions. These different constraints, as stored in the constraint definitions 51 may include generally the Frobenius Norm, the Nuclear Norm, the $\ell_1$ Norm, the $\ell_2$ Norm, Nuclear Norm, and the Total Variation Norm.

The Frobenius Norm constraint constrains the changes in succeeding weights to be:

$$W_{t+1}^{CG} = W_t(1-\eta)\left(W_t + \lambda \frac{g_t}{\|g_t\|_F}\right) \qquad (3)$$

where $\|\cdot\|_F$ is the Frobenius Norm function. This constraint basically describes a n-dimensional sphere constraining the weights similar to that shown in FIG. 4 but at a higher dimension corresponding to many more weights 38.

The Nuclear Norm constraint constrains the changes in succeeding weights to be:

$$W_{t+1}^{CG} = W_t - (1-\eta)(W_t + \lambda u_t v_t^T) \qquad (5)$$

where u and v are the largest left and right singular vectors of $W_t$.

The $\ell_1$ Norm constraint constrains the changes in succeeding weights to be according to equation (2) above where:

$$s_t^j = \begin{cases} -\lambda & \text{if } j = \arg\max_j |g_t^j| \\ 0 & \text{otherwise} \end{cases} \qquad (5)$$

where $s_t$ and $g_t$ are vectors of the same size and the jth coordinate of vector $s_t$ is $-\lambda$ where j is chosen to be the coordinate with the largest magnitude among all coordinates in $g_t$.

This constraint constrains the values of W to an n-dimensional parallelepiped whose vertices are on the axes of the multidimensional coordinate system. This constraint tends to make the weight vector W sparse.

The $\ell_2$ Norm constraint constrains the changes in succeeding weights to be according to equation (2) above where:

$$s_t^j = \begin{cases} +\lambda & \text{if } g_t^j < 0 \\ -\lambda & \text{otherwise} \end{cases} \qquad (5)$$

where all coordinates with negative values in $g_t$ are collected and all such coordinates in $s_t$ are set to $\lambda$ and the remaining coordinates in $s_t$ set to $-\lambda$.

The Total Variation Norm constraint constrains the changes in succeeding weights to have a variance that does not exceed a predetermined value. The total variation Norm constraint constrains the changes in succeeding weights to be according to equation (2) above where:

$$s_t = \arg\min \|x\|_\infty \text{ subject to } x \in F_{u,v}(g_t) \qquad (6)$$

where $F_{u,v}(g_t)$ is the standard flow polytope with weights specified by $g_t$.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a microprocessor" and "a processor" or "the microprocessor" and "the processor," can be understood to include one or more microprocessors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

What we claim is:

1. A neural network architecture for training weights of an artificial neural network, the neural network architecture comprising:
   a set of neurons arranged in multiple layers between network inputs and network outputs, each neuron providing a set of weights applied individually to separate neuron inputs to produce a neuron output;
   a memory adapted to hold a training set comprising a multiple set of examples, each said set linked to a particular desired output;
   an error calculator determining an error between an output at the network output for a given example of a given set compared to the desired output linked to a given set; and
   a constrained weight adjuster globally adjusting the weights of the neurons over multiple iterations according to a backpropagated portion of the error at each neuron at each iteration, the constrained weight adjuster constraining adjustment of given weights according to a predetermined constraint dependent on a value of substantially all weights at a given iteration.

2. The neural network architecture of claim 1 wherein the constrained weight adjuster includes a library of constraint definitions and provides a selector input for selecting among those constraint definitions to provide a different predetermined constraint.

3. The neural network architecture of claim 2 wherein the constraint definitions include constraints constraining a vector sum of the weights and constraints constraining a variance of the weights.

4. The neural network architecture of claim 1 wherein the constrained weight adjuster adjusts the weights of the neurons in a constrained gradient descent in which a gradient of the error at current weights is approximated by a multidimensional plane.

5. The neural network architecture of claim 4 wherein the constrained weight adjuster adjusts the weights by limiting a vector describing the weight to within a predefined multidimensional volume having dimensions equal to a number of substantially all weights.

6. The neural network architecture of claim 5 wherein the predefined multidimensional volume is a sphere.

7. The neural network architecture of claim 6 wherein the predefined multidimensional volume is an n-dimensional parallelepiped.

8. The neural network architecture of claim 7 wherein the parallelepiped has sides aligned with axes of a multidimensional space holding the multidimensional volume.

9. The neural network architecture of claim 6 wherein the parallelepiped has vertices lying on axes passing through an origin of the dimensions.

10. The neural network architecture of claim 4 wherein the adjustment is limited to limit a global variance across the substantially all weights.

* * * * *